United States Patent
Thomas et al.

(10) Patent No.: US 11,568,858 B2
(45) Date of Patent: Jan. 31, 2023

(54) TRANSLITERATION BASED DATA AUGMENTATION FOR TRAINING MULTILINGUAL ASR ACOUSTIC MODELS IN LOW RESOURCE SETTINGS

(71) Applicant: INTERNATIONAL BUSINESS MACHINES CORPORATION, Armonk, NY (US)

(72) Inventors: Samuel Thomas, White Plains, NY (US); Kartik Audhkhasi, White Plains, NY (US); Brian E. D. Kingsbury, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 17/073,337

(22) Filed: Oct. 17, 2020

(65) Prior Publication Data
US 2022/0122585 A1  Apr. 21, 2022

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01); *G10L 2015/0635* (2013.01)

(58) Field of Classification Search
None
See application file for complete search history.

(56) References Cited

U.S. PATENT DOCUMENTS 6,085,160 A * 7/2000 D'hoore ................ G10L 15/005
704/277
9,460,711 B1 10/2016 Vanhoucke et al.
(Continued)

FOREIGN PATENT DOCUMENTS

CN 108711420 A 10/2018
CN 108920473 A 11/2018
(Continued)

OTHER PUBLICATIONS

Niesler, Thomas, and Daniel Willett. "Language identification and multilingual speech recognition using discriminatively trained acoustic models." Multilingual speech and language processing. 2006. (Year: 2006).*
(Continued)

*Primary Examiner* — Shaun Roberts
(74) *Attorney, Agent, or Firm* — Intelletek Law Group, PLLC; Gabriel Daniel, Esq.

(57) ABSTRACT

A computer-implemented method of building a multilingual acoustic model for automatic speech recognition in a low resource setting includes training a multilingual network on a set of training languages with an original transcribed training data to create a baseline multilingual acoustic model. Transliteration of transcribed training data is performed by processing through the multilingual network a plurality of multilingual data types from the set of languages, and outputting a pool of transliterated data. A filtering metric is applied to the pool of transliterated data output to select one or more portions of the transliterated data for retraining of the acoustic model. Data augmentation is performed by adding one or more selected portions of the output transliterated data back to the original transcribed training data to update training data. The training of a new (Continued)

multilingual acoustic model through the multilingual network is performed using the updated training data.

18 Claims, 9 Drawing Sheets

(56) References Cited

U.S. PATENT DOCUMENTS

| | | | |
|---|---|---|---|
| 10,460,043 B2 | 10/2019 | Kim et al. | |
| 2003/0050779 A1* | 3/2003 | Riis | G10L 15/144 704/E15.036 |
| 2011/0218796 A1* | 9/2011 | Suzuki | G06F 40/40 704/2 |
| 2012/0041751 A1* | 2/2012 | Elfeky | G06F 40/51 704/2 |
| 2013/0007035 A1* | 1/2013 | Ajmera | G06F 16/632 707/769 |
| 2014/0257805 A1 | 9/2014 | Huang et al. | |
| 2014/0337007 A1* | 11/2014 | Waibel | G06F 40/58 704/2 |
| 2017/0011735 A1* | 1/2017 | Kim | G10L 15/005 |
| 2017/0018270 A1* | 1/2017 | Min | G10L 15/063 |
| 2018/0307679 A1 | 10/2018 | Duong et al. | |
| 2018/0314689 A1* | 11/2018 | Wang | G10L 15/1822 |
| 2019/0189111 A1 | 6/2019 | Watanabe et al. | |
| 2020/0043495 A1 | 2/2020 | Park et al. | |
| 2020/0098351 A1 | 3/2020 | Feinstein et al. | |
| 2020/0160836 A1* | 5/2020 | Chen | G10L 15/063 |
| 2020/0175961 A1* | 6/2020 | Thomson | G10L 15/28 |
| 2020/0193977 A1* | 6/2020 | Ramabhadran | G10L 15/16 |
| 2020/0380215 A1* | 12/2020 | Kannan | G06N 3/0445 |

FOREIGN PATENT DOCUMENTS

| | | |
|---|---|---|
| CN | 110795946 A | 2/2020 |
| CN | 111261144 A | 6/2020 |
| CN | 111507114 A | 8/2020 |
| CN | 111557029 A | 8/2020 |
| WO | 2020/046807 A1 | 3/2020 |

OTHER PUBLICATIONS

Mell, P. et al., "Recommendations of the National Institute of Standards and Technology"; NIST Special Publication 800-145 (2011); 7 pgs.

Ma, M. et al., "Comparison of Data Augmentation and Adaptation Strategies for Code-Switched Automatic Speech Recognition"; IEEE International Conference on Acoustics, Speech and Signal Processing (ICASSP-2019); pp. 6081-6085.

Datta, A., "Language-Agnostic Multilingual Modeling"; IEEE International Conference on Acoustics, Speech and Signal Processing (ICASSP-2020); pp. 8239-8243.

International Search Report and Written Opinion dated Jan. 21, 2022 in related application No. PCT/CN2021/124149; 10 pgs.

\* cited by examiner

| Condition | 401 | 402 | 403 | 404 | Hrs. |
|---|---|---|---|---|---|
| [A1] Mono | 52.0 | 56.2 | 41.8 | 44.4 | 210 |
| [B1] Mult | 48.4 | 54.3 | 40.7 | 44.0 | 850 |
| [C1] Mult+TL-ALL | 47.9 | 54.0 | 40.5 | 43.7 | 1350 |
| [D1] Mult+TL-FL1 | 46.5 | 52.8 | 39.3 | 42.6 | 1320 |
| [E1] Mult+TL-FL2 | 46.6 | 52.6 | 39.1 | 42.6 | 1050 |
| [F1] Mult+TL-FL3 | 46.0 | 52.7 | 39.1 | 42.4 | 1230 |

Model performance (WER%) with transliterated training data

FIG. 3

| 405 Condition | 401 | 402 | 403 | 404 | Hrs. |
|---|---|---|---|---|---|
| [A1] Mono | 52.0 | 56.2 | 41.8 | 44.4 | 210 |
| [B1] Mult | 48.4 | 54.3 | 40.7 | 44.0 | 850 |

| 415 Condition | 401 | 402 | 403 | 404 | Hrs. |
|---|---|---|---|---|---|
| [A2] Mult+ST | 46.9 | 53.5 | 40.1 | 43.9 | 1000 |
| [B2] Mult+ST+TL | 45.8 | 52.3 | 39.1 | 42.6 | 1460 |

| 420 Condition | 401 | 402 | 403 | 404 | Hrs. |
|---|---|---|---|---|---|
| [A3] Mult+CRS1 | 46.8 | 53.5 | 39.7 | 43.2 | 1390 |
| [B3] Mult+CRS2 | 47.8 | 54.1 | 40.7 | 44.0 | 1430 |

FIG. 4

| Training condition | IT | Hrs. |
|---|---|---|
| [A4] IT-Mono.(rand) | 32.8 | 200 |
| [B4] IT-Mono.(mult) | 31.8 | 200 |
| [C4] IT-Mult | 28.9 | 1050 |
| [D4] IT-Mult+TL | 25.0 | 1800 |

Model performance (WER%) after porting the model to include a new language - Italian

FIG. 5

TRANSLITERATION BASED DATA AUGMENTATION FOR TRAINING MULTILINGUAL ASR ACOUSTIC MODELS IN LOW RESOURCE SETTINGS

BACKGROUND

Technical Field

The present disclosure generally relates to acoustic speech recognition (ASR), and more particularly, to training multilingual ASR acoustic models.

Description of the Related Art

Acoustic models for speech recognition systems typically involve several hundred hours of task-specific training data. However, there are challenges presented when the amount of available resources for task-specific training is low, for example, in an amount much less than the typical hundreds or thousands of hours (e.g., in the tens of hours). Low resource settings render it difficult to train acoustic models sufficiently. Thus, the error rate of such acoustic models is typically much higher than in a case where there are sufficient training resources.

In such low resource settings, transcribed data from other languages can be used to build multilingual acoustic models. Such multilingual acoustic models are then used either to extract multilingual bottleneck features for subsequent processing, or may be directly used as acoustic models after performing a fine tuning step on the low resource language. Previous attempts to address the problems of low resource settings included applying data augmentation to training data that did not result in a noticeable improvement in training the acoustic models, as well as manual intervention.

However, the word error rates (WER) of acoustic models trained with low resource settings, even with the additional transcribed data, is relatively high. Previous attempts to improve the performance include: (1) data augmentation to clean speech; (2) vocal tract length perturbation (VTLP); (3) audio speed and temp perturbation, and various combinations of such methods.

Accordingly, there is a need to address the problem of training multilingual acoustic models in low resource settings with a reduced WER.

SUMMARY

According to one embodiment, a computer-implemented method of building a multilingual acoustic model for automatic speech recognition in a low resource setting includes training a multilingual network on a set of training languages with an original transcribed training data to create a baseline multilingual acoustic model. Transliteration of transcribed training data is performed by processing through the multilingual network a plurality of multilingual data types from the set of languages, and outputting a pool of transliterated data. A filtering metric is applied to the pool of transliterated data output to select one or more portions of the transliterated data for retraining of the acoustic model. Data augmentation is performed by adding one or more selected portions of the output transliterated data back to the original transcribed training data to update training data. A new multilingual acoustic model is trained with the updated training data. This computer-implemented method provides more accurate training of a multilingual acoustic model at least because of the transliteration and data augmentation operations, and performing the data augmentation to the output transliterated data. The application of the data augmentation to the output transliterated data, particularly is a low resource setting also provides for a more diverse and accurate training of the acoustic model as the training data is improved and increased.

In one embodiment, the computer-implemented method further includes retraining the baseline multilingual acoustic model with the updated training data. This operation results in a more accurate and robust baseline acoustic model.

In one embodiment, the original training data is from a low resource language, and the multilingual network includes a neural network including a plurality of language-specific output layers configured to model sets of symbols of each language separately, and wherein the neural network outputs a language-specific portion of the transliterated data to at least one respective language-specific output layer. The use of a neural network provides a faster and more efficient training of the acoustic model.

In one embodiment, the adding the one or more selected portions of the output transliterated data back to the original transcribed training includes relabeled data formed of new copies of data using symbols of other languages. The relabeling of the data formed of new copies of data using symbols of other languages assists the multilingual network in training the multilingual acoustic model.

In one embodiment, the training of the multilingual network on a set of training languages is performed with the low resource setting of the original transcribed training data comprising tens of hours of the original transcribed data. The method provides for a more accurate training of the acoustic model, as low resource settings are otherwise difficult to train accurately and efficiently.

In one embodiment, the computer-implemented method includes generating semi-supervised labels in response to processing untranscribed data by the multilingual neural network.

In one embodiment, filtering the pool of transliterated data is performed by selecting the one or more portions of the pool of transliterated data having a relatively higher count of symbols as compared to a remainder of the transliterated data. This operation provides for training a more accurate acoustic model. The application of a filtering metric provides for a more robust and accurate training of the multilingual acoustic model.

In one embodiment, the application of the metric filtering to the pool of transliterated data is performed by comparing a ratio of symbols in the transliterated data to symbols in an utterance comprising the original transcribed training data, and selecting one or more portions of the pool of transliterated data having the higher ratio of symbols. The application of a filtering metric provides for a more robust and accurate training of the multilingual acoustic model.

In one embodiment, the processing of the plurality of multilingual data types includes processing of: transcribed training data, untranscribed data from the same set of training languages and untranscribed data from different languages.

In one embodiment, a new language is added to the input to the multilingual network, and the transliterated data in the new language is output. New languages add to the diversity of the robust model to improve accuracy and training.

According to an embodiment, an automatic speech recognition system configured for a transliteration-based data augmentation of a multilingual acoustic model includes a processor, and a memory coupled to the processor. The memory stores instructions to cause the processor to perform acts including: train a multilingual network on a set of training languages with an original transcribed training data to create a baseline multilingual acoustic model, perform transliteration by processing through the multilingual network a plurality of multilingual data types from the set of languages, and output a pool of transliterated data. A filtering metric is applied to the pool of transliterated data output from the multilingual network to select one or more portions of the transliterated data for retraining of the acoustic model. Data augmentation is performed by adding the one or more selected portions of the output transliterated data back to the original transcribed training data to obtain updated training data. The updated training data is processed through the multilingual network and retraining the multilingual acoustic model with the updated training data. This configuration provides more accurate training of an acoustic model at least because of the transliteration and data augmentation operations, and performing the data augmentation to the output transliterated data.

In one embodiment, the multilingual network comprises a neural network including a plurality of language-specific output layers configured to model sets of symbols of each language separately, and wherein the neural network is configured to output a language-specific portion of the transliterated data to at least one respective language-specific output layer. The use of a neural network provides a faster and more efficient training of the acoustic model.

According to an embodiment, a non-transitory computer-readable storage medium tangibly embodying a computer-readable program code having computer-readable instructions that, when executed, causes a computer device to perform a method of building a multilingual acoustic model for automatic speech recognition in a low resource setting. The method includes training a multilingual model with end-to-end recurrent layers on a pooled data set drawn from a plurality of languages.

A transcribed training data is transliterated by forward passing acoustic features for each utterance through a trained network. Untranscribed training data belonging to languages used to train the network is transliterated by forward passing the data through the network. A filtering metric is applied that includes at least one of a count of a number of symbols in a transliterated output of an utterance, or a ratio of a symbol count in a transliterated language to a symbol count of the reference transcript. Data augmentation is performed by adding the transliterated data to the training pool of languages and training a new multilingual model.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 illustrates an acoustic model performance, consistent with an illustrative embodiment.

FIG. 4 illustrates an acoustic model performance, consistent with an illustrative embodiment.

FIG. 5 illustrates a model performance in terms of a word error rate (WER %) after porting the model to include a new language, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

While illustrative embodiments of the present disclosure are directed to building multilingual acoustic models for original training data in low resource settings, the computer-implemented methods and system are not limited to such conditions. A low resource setting is one where, for example, there are only tens of hours of training data available. It is to be understood that a "low resource language" is a language in which there are insufficient quantities of language resources to train an automatic speech recognition system to operate with an acceptable word error rate. There are multiple dialects of some languages where there is insufficient training data available. Although the present disclosure addresses how to overcome the problem with training automatic speech recognition systems, the teachings are also applicable and provide benefits to higher resource settings that may have thousands of hours of training data available, as compared to the tens of hours that may be available for the low resource settings.

The computer-implemented method and device of the present disclosure provides for an improvement in the accuracy of training and implementation of acoustic models used in devices such as automatic speech recognition (ASR) systems, especially in an cases where there are low resource settings of training data that may be insufficient to train the acoustic models to perform with a satisfactory accuracy rate. In addition, the computer-implemented method and device of the present disclosure provides an improvement in the efficiency of computer operations. For example, by virtue of the teachings herein, the technical improvement results in a reduction in the amount of processing power required to train and operate acoustic models in ASR systems, as fewer epochs, iterations, and less time are used to obtain models that provide accurate results. There is a reduced and/or eliminated need for human interaction to correct errors in acoustic model operations, which renders the computer operation more efficient. The reduction in epochs and iterations also provide a reduction in the use of computer memory. There is realized a time savings in producing; a more accurate acoustic model using the teachings of the present disclosure.

Example Architecture

Figure 1:
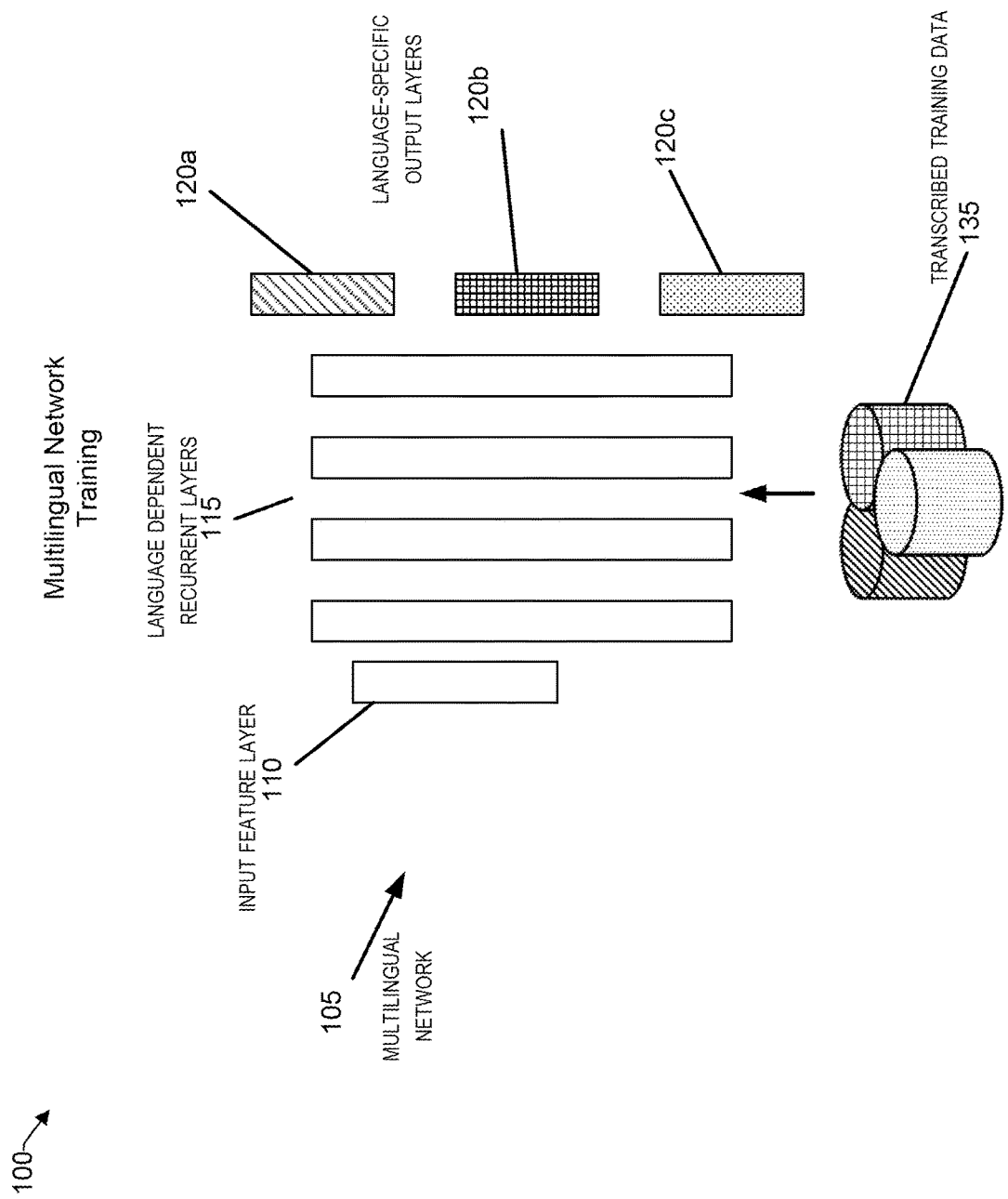
FIG. 1 provides an overview of the architecture of a multilingual network consistent with an illustrative embodiment.

FIG. 1 provides an overview of an example architecture 100 of a multilingual network, consistent with an illustrative embodiment. In this illustrative embodiment, the multilingual network 105 includes an input feature layer 110, a plurality of shared language independent recurrent later 115, and language-specific output layers 120a, 120b and 120c. Transcribed training data 135 is also shown.

Figure 2:
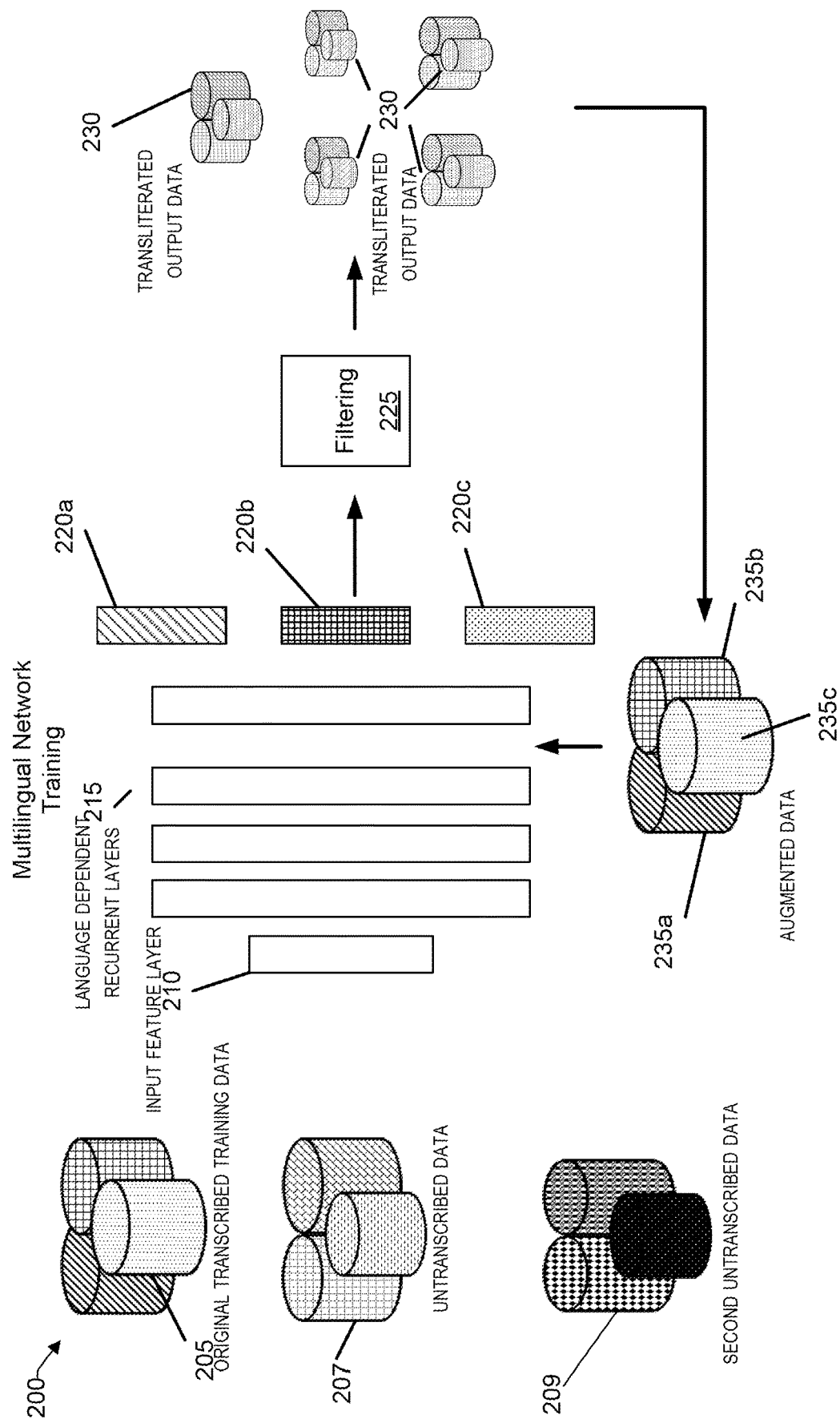
FIG. 2 shows the multilingual network of FIG. 1 with various types of training data and a filtering metric, consistent with an illustrative embodiment.

The input feature layer 110 receives the original transcribed data. The original transcribed data is a representation of spoken or emitted sounds, such as utterances. In an automatic speech recognition system, an utterance is transcribed into symbols associated with the language of the utterance. For example, an English utterance is transcribed into English, an utterance in Japanese is transcribed into Japanese, etc. The transcribed data is pushed through (e.g., processed) by the multilingual network 105. The multilingual network can be a neural network, and as shown in this illustrative embodiment, the layers of the neural network perform various functions of language processing. The shared independent recurrent layers process the original transcribed data by performing operations such as transliteration. The transliteration functions apply symbols of other languages to represent the utterance. As there is some degree of commonality in sounds made by humans, an utterance in English can be transliterated into symbols of different languages (e.g., Hindi, Mongolian, Javanese, Spanish, Mandarin) to create a pool of transliterated data. The shared language dependent recurrent layers 115 provide the transliterated dated to language-specific output layers 120a, 120b, 120c, etc. In this illustrative embodiment, the output layer 120 outputs the original transcribed data, whereas output layers 120a and 120c are transliterated output layers, meaning that there is a language-specific output of transliterated data. The transcribed training data 135 includes data that is subject to additional processing functions prior to being added back to the layers of the multilingual network for further processing, FIG. 2 shows an overview 200 of the multilingual network of FIG. 1 with various types of training data and a filtering metric, consistent with an illustrative embodiment. For example, FIG. 2 shows different kinds of input data that can be provided to the input feature layer 210. The original transcribed training data 205, which may represent one or more utterances in the symbols of the language is shown as one of the inputs to the input feature layer 210. Additional data, such as a first untranscribed data 207 in the same language as the transcribed training data of the utterances, and a second untranscribed data 209 in a different language than the language of the transcribed data of the utterances are shown. One or both of the untranscribed data can be input with the original transcribed data to improve the training of a multilingual acoustic model in terms of accuracy and capability of the acoustic model to be used in training automatic speech recognition systems.

Referring now to the description above regarding FIG. 1 and FIG. 2, the language-specific output layers 220a, 220b, 220c shown in FIG. 2 provide the output pool of transliterated data. The output pool of data has a filtering metric 225 applied to select the data that will increase the accuracy of the training of an acoustic model. There are several functions that can be used as a filtering metric 225.

One such filtering according to the filtering metric 225 is by performing a count of symbols of transliterated data for each of the language-specific outputs, and selecting a highest or group of highest or relatively high symbols counts (relative to languages with lower symbol counts). The higher symbol counts can provide for the selection of transliterated data that provides for a more accurate training of the multilingual acoustic model.

Another filtering function that can be performed according to the filtering metric 225 is comparing a ratio of symbols in the transliterated data to symbols in the original transcribed data of the utterance, and selecting one or more portions of the output transliterated data having the higher ratio of symbols.

Multilingual data augmentation can then be performed by adding one or more selected portions of the transliterated output data 230 to the original transcribed training data 235. FIG. 2 identifies the languages of the three language-specific output layers, with 235a, 235c being the language output by respective layers 220a, 220c and subjected to the filtering metric and data augmentation. The original transcribed data 235b after data augmentation is the output of language-specific layer 220b after an additional processing. The augmented data 235a, 235b, 235c, is then input back to the multilingual network for further processing. There can be a number of iterations performed so that training data for a multi-language acoustic model is created to increase the accuracy of the acoustic model. In low-resources settings, the teachings of the present disclosure provide for a more accurate training of the multilingual acoustic model while conserving computational resources.

FIG. 3 is a table 305 that illustrates an acoustic model performance, consistent with an illustrative embodiment. FIG. 3 identifies experiments on low resource languages (identified as conditions 401, 402, 403 and 404). These monolingual models include Mongolian, Javanese, Dhuluo and Georgian, respectively. Label "C1" identifies the use of all transliterate data, whereas "D1" identifies data selected though a filtering metric, E1 identifies 50 hours of data using a filtering metric, and F1 identifies 100 hours of data using a filtering metric. It can be seen that there is a decrease in the word error rate percentage in each of the languages by the use of transliterated training data. As the quantity of resources increases, each of the languages show improvement in the word error rate percentage.

FIG. 4 illustrates an acoustic model performance, consistent with an illustrative embodiment. Similar to FIG. 3, the baseline performance 405 and a model performance with untranscribed training data 415 is shown. The model performance with untranscribed cross-lingual data 420 is also shown.

The baseline performance 405 includes monolingual and multilingual conditions. The model performance with untranscribed training data 415 includes semi-supervised (ST) transcripts. For example, the multilingual network can be used to transcribe untranscribed data. When untranscribed data corresponding to a language used to train the multilingual network, the network can produce transcripts for that data. Since the labels are generated automatically without human annotations, it is called semi-supervised data. In addition, the model performance 415 includes transliterated (TL) language symbols. With reference to the model performance with untranscribed cross-lingual data 420, the "CSR1" includes languages Cebuano, Kazakh, Telegu, and Lithuanian, "CSR2" includes Pashto, Paraguayan Guarani, Igbo, and Amharic.

FIG. 5 illustrates a model performance (WER %) after porting the model to include a new language, consistent with an illustrative embodiment. FIG. 5 shows the porting of the model to include a new language (Italian). It can be seen there is an improvement in performance with the increased hours of training.

With further regard to FIG. 5, Italian is the new language being trained on. For example, A4 is the case when a network is trained on just Italian—the weights for this network are randomly initialized. In B4, the network is trained on just Italian again, but this time the network is initialized to form a multilingual network that has been trained on many languages (but not yet Italian). The network is better initialized in this case and hence B4 is better than A4. C4 is the case when a multilingual system is trained. Italian is now one of the multilingual languages and hence the trained model can be used to process Italian. C4 is better than A4 or B4 because of multilingual training. D4 is a case where an even better multilingual network is trained. This model now uses additional transliterated data for training.

It is to be understood that acoustic models trained for ASR are generally placed under two categories—hybrid acoustic model or end-to-end acoustic models. The teachings of the present disclosure can be applied to both categories. Thus, while a Connectionist Temporal Classification (CTC) is one type of training method that can be used in an end-to-end acoustic model training, the present disclosure is not limited to end-to-end acoustic model training.

Example Process

With the foregoing overview of the example architecture, it may be helpful now to consider a high-level discussion of an example process. To that end, in conjunction with FIGS. 1-5, FIG. 6 depicts a flowchart 600 illustrating a seismic imaging operation including a configuration phase and execution phase, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 6:
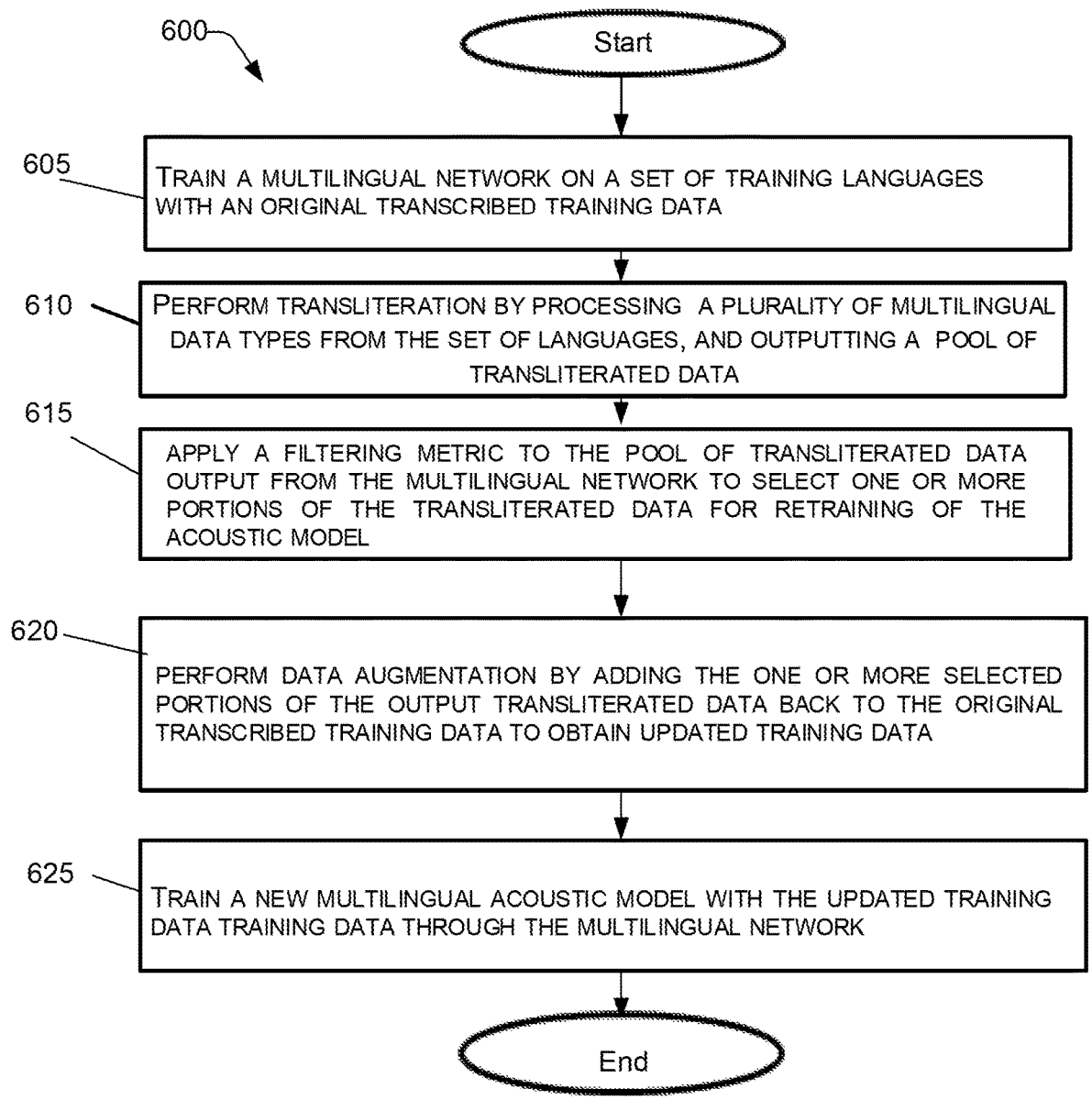
FIG. 6 is a flowchart illustrating a computer-implemented method of building a multilingual acoustic model for ASR, consistent with an illustrated embodiment.

Referring now to FIG. 6, at operation 605, a multilingual network is trained on a set of training languages with an original transcribed training data. The original transcribed training data are, for example, utterances that are transcribed into their native language. For example, an English utterance is transcribed using English symbols and graphemes. However, it is to be understood that other symbols can be used. Phonemes, sub-words, whole words, etc., can also be used in place of or along with graphemes. In this example, the original transcribed setting is a low resource setting, which means there are tens of hours of training data (as opposed to hundreds or thousands of hours of training data in a typical resource setting).

At operation 610, transliteration is performed by processing a plurality of multilingual data. In transliteration, an utterance in one language is represented by symbols of a different language than the one in which the utterance is made. In a low resource setting environment, a pool of transliterated data can be output by the multilingual network.

At operation 615, a filtering metric is applied to the pool of transliterated data output from the multilingual network to select one or more portions of the transliterated data for the retraining of the acoustic model. The portions are selected for the purpose of retraining the acoustic model to increase the accuracy (i.e., decrease the word error rate), and to make the acoustic model more robust by increasing the amount of training data. An example of applying a filter metric is selecting the one or more portions of transliterated data having relatively higher count of symbols as compared to a remainder of the transliterated data. For example, in the case of an utterance, a higher count of symbols may more accurately define the utterance.

In another example, applying the filtering metric to the output pool of transliterated data is performed by comparing a ratio of symbols in the transliterated data to symbols in an utterance comprising the original transcribed training data, and selecting one or more portions of the output transliterated data having the higher ratio of symbols. It will be understood that if there are multiple portions selected, in one embodiment, the highest ratios may follow an order (e.g., first highest, second highest, third highest, etc.).

At operation 620, the data augmentation is performed by adding the one or more selected portions of transliterated data selected via application of the filtering metric back to the original transcribed data. Data augmentation can provide multiple representations of, for example, an utterance, both in the language of the original transcribed data, and in the augmented data that may represent the utterance using symbols from a different language than the language of the utterance. For example, the utterance may be in English, but augmented data may use symbols in Hindi to express the utterance. Thus, the augmented data can be considered to be an updated training data.

At operation 625, the multilingual network trains a new multilingual acoustic model with the updated training data. The process ends after operation 625. However, it is to be understood that multiple epochs may be performed to increase the accuracy and robustness of the multilingual acoustic model. New language can be added and additional transliterated data generated to increase the accuracy and robustness of the multilingual acoustic model. In the present disclosure, it is also possible to retrain the baseline multilingual acoustic model with the updated training data.

Figure 7:
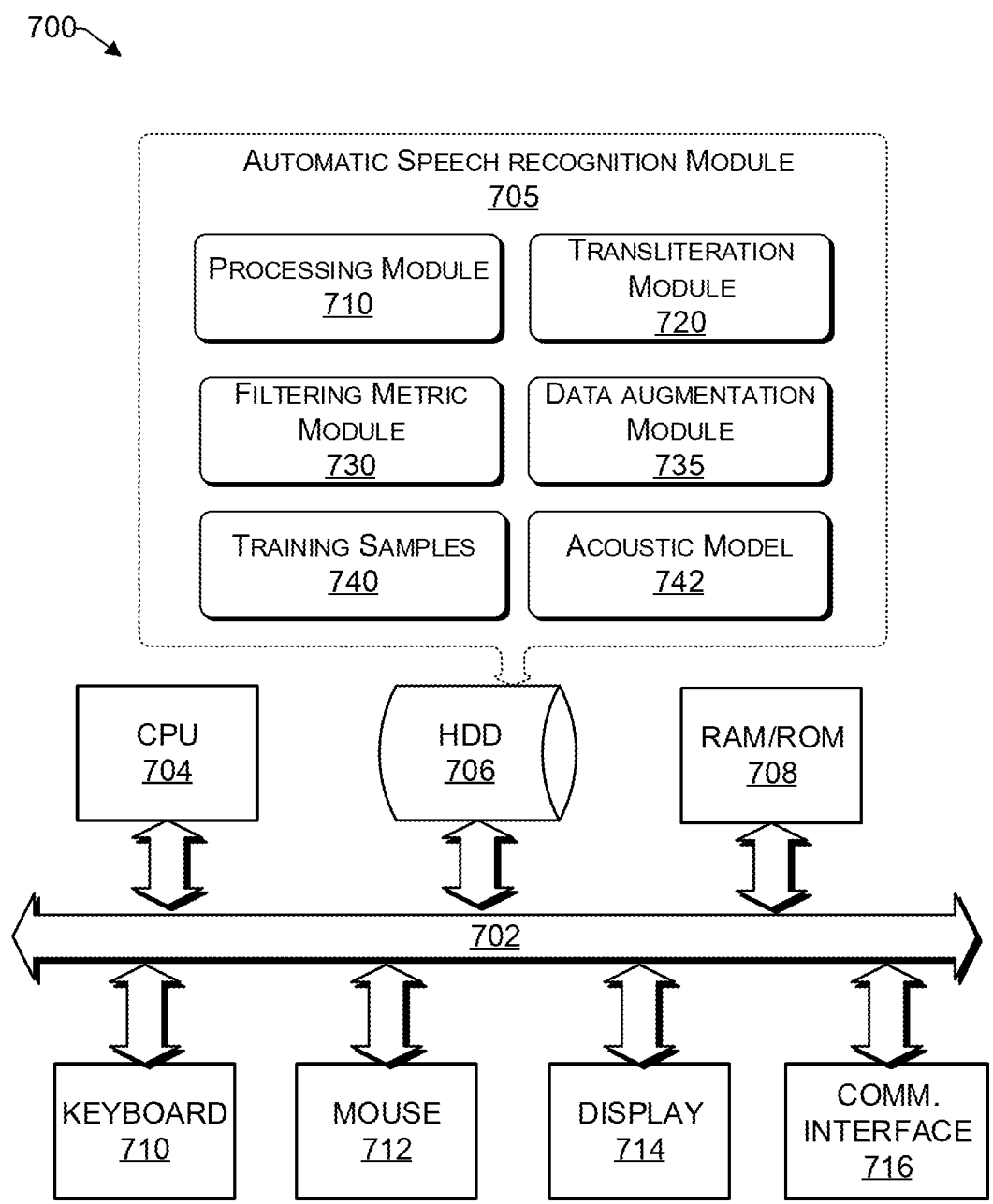
FIG. 7 is a functional block diagram illustration of a computer hardware platform that can communicate with various networked components of a system for seismic imaging, consistent with an illustrative embodiment.

FIG. 7 provides a functional block diagram illustration 700 of a computer hardware platform. In particular, FIG. 7 illustrates a particularly configured network or host computer platform 700, as may be used to implement the method shown in FIG. 6.

The computer platform 700 may include a central processing unit (CPU) 704, a hard disk drive (HDD) 706, random access memory (RAM) and/or read-only memory (ROM) 708, a keyboard 710, a mouse 712, a display 714, and a communication interface 716, which are connected to a system bus 702. The HDD 706 can include data stores.

In one embodiment, the HDD 706, has capabilities that include storing a program that can execute various processes, such as an automatic speech recognition 705 (ASR) operation, in a manner described herein. The ASR module 705 provides management of an automatic speech recognition process, such as for training a multilingual acoustic model 742. A network processing module 710 processes training data in a low resource setting to create a baseline multilingual acoustic module. The transliteration module 720 uses symbols from at least one language to represent an utterance made in another language and the network processing module 720 outputs a pool of transliterated data. The filtering metric module 730 is configured for application to the output pool of transliterated data, and is further configured to select one or more portions of the transliterated data for retraining of the acoustic model 742. A data augmentation module 735 is configured to augment the training data by adding one or more selected portions of the output transliterated data back to the original transcribed data to retrain the acoustic model 742. A training sample module 740 stores multilingual data to train the network processor module.

Example Cloud Platform

As discussed above, functions relating to environmental and ecological optimization methods may include a cloud. It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 8:
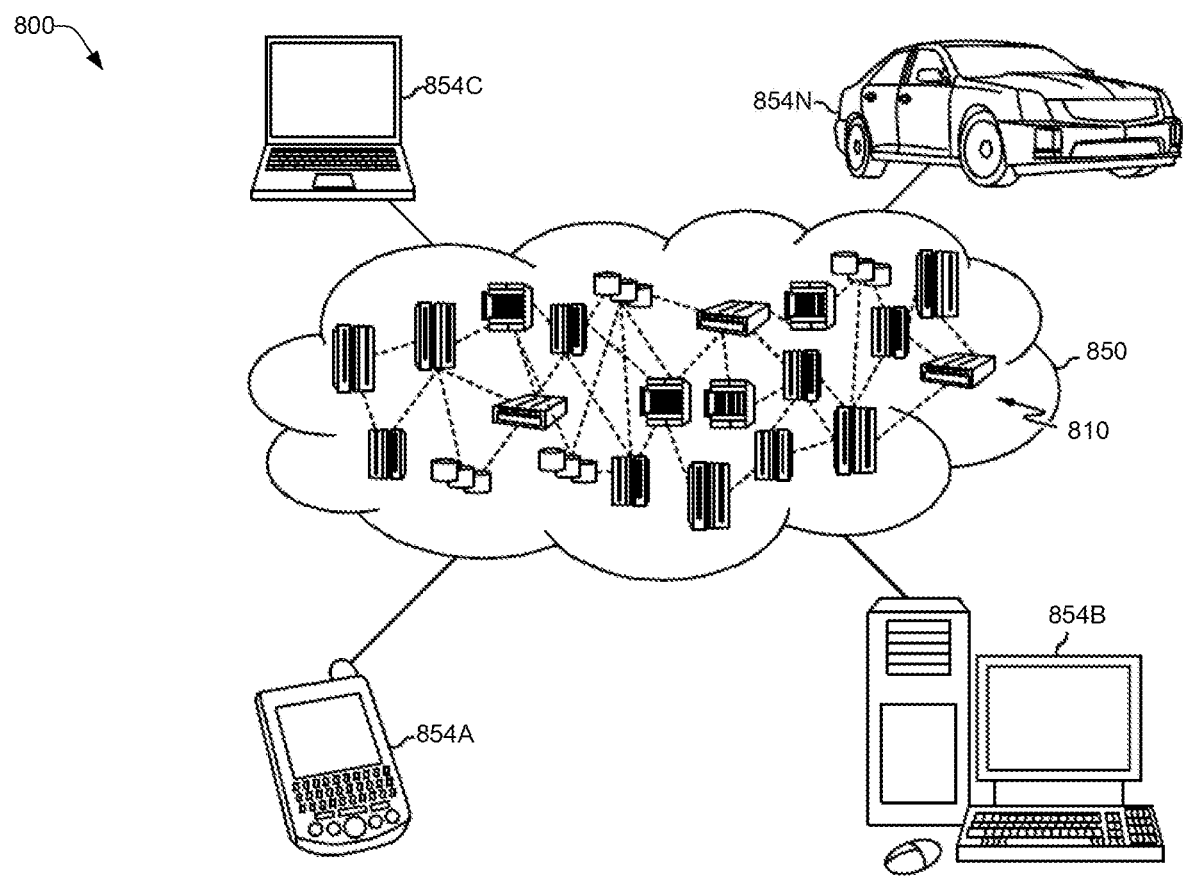
FIG. 8 depicts an illustrative cloud computing environment, consistent with an illustrative embodiment.

Referring now to FIG. 8, an illustrative cloud computing environment 800 utilizing cloud computing is depicted. As shown, cloud computing environment 800 includes cloud 850 having one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms, and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
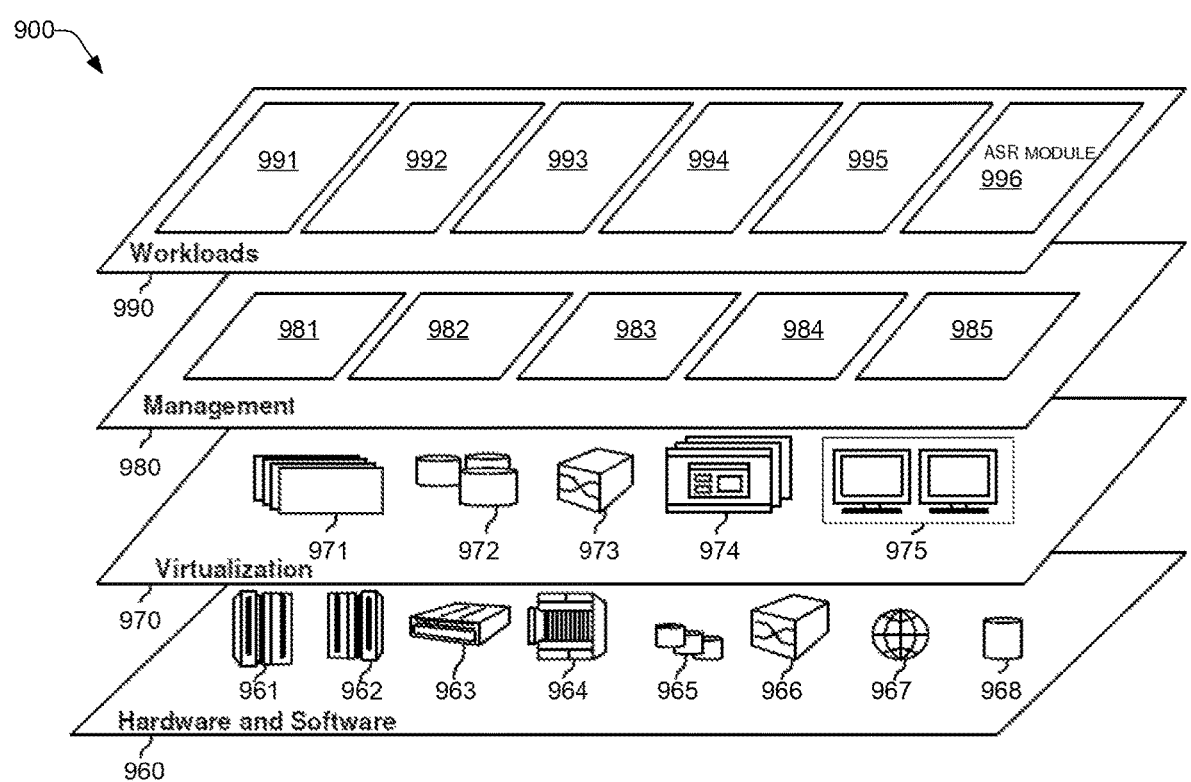
FIG. 9 depicts a set of functional abstraction layers provided by a cloud computing environment, consistent with an illustrative embodiment.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and an ASR module 996 to perform seismic imaging on a hybrid cloud-based platform, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of building a multilingual acoustic model for automatic speech recognition in a low resource setting, the method comprising:
   training a multilingual network on a set of training languages with an original transcribed training data to create a baseline multilingual acoustic model;
   performing transliteration by processing through the multilingual network a plurality of multilingual data types from the set of languages, and outputting a pool of transliterated data;
   applying a filtering metric to the pool of transliterated data output from the multilingual network to select one or more portions of the transliterated data for a retraining of the acoustic model by selecting the one or more portions of the output transliterated data having a relatively higher count of symbols as compared to a remainder of the transliterated data;
   performing data augmentation by adding the one or more selected portions of the pool of transliterated data back to the original transcribed training data to obtain updated training data; and
   training a new multilingual acoustic model through the multilingual network using the updated training data.

2. The computer-implemented method according to claim 1, further comprising:
   retraining the baseline multilingual acoustic model with the updated training data.

3. The computer-implemented method according to claim 1, wherein:
   the original training data is from a low resource language;
   the multilingual network comprises a neural network including a plurality of language-specific output layers configured to model sets of symbols of each language separately; and
   the neural network outputs a language-specific portion of the transliterated data to at least one respective language-specific output layer.

4. The computer-implemented method according to claim 3, wherein the adding of the one or more selected portions of the pool of transliterated data back to the original transcribed training includes relabeled data comprising new copies of data using symbols of other languages.

5. The computer-implemented method according to claim 3, wherein the training of the multilingual network on a set of training languages is performed with the low resource language of the original transcribed training data comprising tens of hours of the original transcribed data.

6. The computer-implemented method according to claim 3, further comprising generating semi-supervised labels in response to processing untranscribed data by the multilingual neural network.

7. The computer-implemented method according to claim 1, wherein the processing of the plurality of multilingual data types includes processing transcribed training data, untranscribed data from the same set of training languages, and untranscribed data from different languages.

8. The computer-implemented method according to claim 1, further comprising:
   adding a new language to the multilingual network; and
   outputting a transliterated data in the new language.

9. An automatic speech recognition system configured for a transliteration-based data augmentation of a multilingual acoustic model in a low resource setting, the system comprising:
   a processor;
   a memory coupled to the processor, the memory storing instructions to cause the process or to perform acts comprising:
      training a multilingual network on a set of training languages with an original transcribed training data to create a baseline multilingual acoustic model;
      performing transliteration by processing through the multilingual network a plurality of multilingual data types from the set of languages, and outputting a pool of transliterated data;
      applying a filtering metric to the pool of transliterated data output from the multilingual network to select one or more portions of the transliterated data for retraining of the acoustic model by selecting the one or more portions of the output transliterated data having a relatively higher count of symbols as compared to a remainder of the transliterated data;
      performing data augmentation by adding the one or more selected portions of the output transliterated data back to the original transcribed training data to obtain updated training data; and
      training a new multilingual acoustic model using the updated training data.

10. The system according to claim 9, wherein the instructions cause the processor to perform an additional act comprising:
    retraining the baseline multilingual acoustic model with the updated training data.

11. The system according to claim 9, wherein:
    the multilingual network comprises a neural network including a plurality of language-specific output layers configured to model sets of symbols of each language separately: and
    the neural network is configured to output a language-specific portion of the transliterated data to at least one respective language-specific output layer.

12. The system according to claim 9, wherein the processing of the plurality of multilingual data types includes processing transcribed training data, untranscribed data from the same set of training languages, and untranscribed data from different languages.

13. The system according to claim 12, wherein the instructions cause the processor to perform additional acts comprising:
    adding a new language to the multilingual network: and
    outputting transliterated data in the new language.

14. A computer-implemented method of building a multilingual acoustic model for automatic speech recognition in a low resource setting, the method comprising:

training a multilingual network on a set of training languages with an original transcribed training data to create a baseline multilingual acoustic model;

performing transliteration by processing through the multilingual network a plurality of multilingual data types from the set of languages, and outputting a pool of transliterated data;

applying a filtering metric to the pool of transliterated data output from the multilingual network to select one or more portions of the transliterated data for a retraining of the acoustic model by comparing a ratio of symbols in the transliterated data to symbols in an utterance comprising the original transcribed training data, and selecting one or more portions of the output transliterated data having a higher ratio of symbols;

performing data augmentation by adding the one or more selected portions of the pool of transliterated data back to the original transcribed training data to obtain updated training data; and training a new multilingual acoustic model through the multilingual network using the updated training data.

15. An automatic speech recognition system configured for a transliteration-based data augmentation of a multilingual acoustic model in a low resource setting, the system comprising:

a processor;

a memory coupled to the processor, the memory storing instructions to cause the process or to perform acts comprising:

training a multilingual network on a set of training languages with an original transcribed training data to create a baseline multilingual acoustic model;

performing transliteration by processing through the multilingual network a plurality of multilingual data types from the set of languages, and outputting a pool of transliterated data;

applying a filtering metric to the pool of transliterated data output from the multilingual network to select one or more portions of the transliterated data for retraining of the acoustic model by:

comparing a ratio of symbols in the transliterated data to symbols in an utterance comprising the original transcribed training data; and selecting one or more portions of the output transliterated data having a higher ratios of symbols;

performing data augmentation by adding the one or more selected portions of the output transliterated data back to the original transcribed training data to obtain updated training data; and training a new multilingual acoustic model using the updated training data.

16. A non-transitory computer-readable storage medium tangibly embodying a computer-readable program code having computer-readable instructions that, when executed, causes a computer device to perform a method of building a multilingual acoustic model for automatic speech recognition in a low resource setting, the method comprising:

training a multilingual model with end-to-end recurrent layers on a pooled data set drawn from a plurality of languages;

transliterating transcribed training data by forward passing acoustic features for each utterance through a trained network;

transliterating untranscribed training data by forward passing data through the network belonging to languages used to train the network;

applying a filtering metric comprising at least one of a count of a number of symbols in a transliterated output of an utterance, or a ratio of a symbol count in a transliterated language to a symbol count of the reference transcript; and performing data augmentation by adding the transliterated data to the training pool of languages and training a new multilingual model.

17. The computer-readable storage medium according to claim 16, wherein a baseline of the multilingual model is trained for a fixed number of epochs in a first operation.

18. The computer-readable storage medium according to claim 16, wherein performing the data augmentation includes using unsupervised data, and performing the transliterating across the training pool of languages to improve acoustic model in low resource settings.

* * * * *